US012403661B2

(12) United States Patent
Cohen Azaria et al.

(10) Patent No.: US 12,403,661 B2
(45) Date of Patent: Sep. 2, 2025

(54) METHOD AND SYSTEM FOR MONITORING AMOUNT OF SUPPLY MATERIAL IN ADDITIVE MANUFACTURING

(71) Applicant: Stratasys Ltd., Rehovot (IL)

(72) Inventors: Mordechai Cohen Azaria, Petach Tikva (IL); Chen Turkenitz, Kfar Saba (IL); Omer Jacob, Tzur Hadassah (IL); Eitan Pinhasi, Petach Tikva (IL)

(73) Assignee: Stratasys Ltd., Rehovot (IL)

( * ) Notice: Subject to any disclaimer, the term of this patent is extended or adjusted under 35 U.S.C. 154(b) by 575 days.

(21) Appl. No.: 17/624,596

(22) PCT Filed: Jul. 1, 2020

(86) PCT No.: PCT/IL2020/050734
§ 371 (c)(1),
(2) Date: Jan. 4, 2022

(87) PCT Pub. No.: WO2021/001827
PCT Pub. Date: Jan. 7, 2021

(65) Prior Publication Data
US 2022/0250330 A1    Aug. 11, 2022

Related U.S. Application Data

(60) Provisional application No. 62/870,700, filed on Jul. 4, 2019.

(51) Int. Cl.
*B29C 64/112* (2017.01)
*B29C 64/259* (2017.01)
(Continued)

(52) U.S. Cl.
CPC .......... *B29C 64/393* (2017.08); *B29C 64/112* (2017.08); *B29C 64/259* (2017.08);
(Continued)

(58) Field of Classification Search
CPC ... B29C 64/393; B29C 64/259; B29C 64/112; G01F 23/14
See application file for complete search history.

(56) References Cited

U.S. PATENT DOCUMENTS

| 5,629,728 A | 5/1997 | Karita et al. |
| D387,379 S | 12/1997 | Sasaki |

(Continued)

FOREIGN PATENT DOCUMENTS

| EP | 0606627 | 7/1994 |
| EP | 1384589 | 1/2004 |

(Continued)

OTHER PUBLICATIONS

Communication Pursuant to Article 94(3) EPC Dated Feb. 15, 2023 From the European Patent Office Re. Application No. 20745318.4 (4 Pages).

(Continued)

*Primary Examiner* — Alison L Hindenlang
*Assistant Examiner* — Erica Hartsell Funk

(57) ABSTRACT

A method of monitoring an amount of building material in a cartridge that supplies the material to an additive manufacturing system, comprises introducing gas into the cartridge and measuring the pressure within the cartridge. When the pressure reaches a predetermined level, the amount of building material in the cartridge is determined based on a volume of gas introduced into the cartridge or based on a proxy of the volume.

19 Claims, 10 Drawing Sheets

(51) Int. Cl.
  *B29C 64/393* (2017.01)
  *B33Y 10/00* (2015.01)
  *B33Y 30/00* (2015.01)
  *B33Y 50/00* (2015.01)
  *G01F 23/14* (2006.01)

(52) U.S. Cl.
  CPC .............. *B33Y 10/00* (2014.12); *B33Y 30/00* (2014.12); *B33Y 50/00* (2014.12); *G01F 23/14* (2013.01)

(56) References Cited

U.S. PATENT DOCUMENTS

| | | | |
|---|---|---|---|
| D392,995 S | 3/1998 | Sasaki | |
| 6,007,318 A * | 12/1999 | Russell | B41J 2/16552 |
| | | | 425/130 |
| D438,897 S | 3/2001 | Hatasa et al. | |
| 6,259,962 B1 | 7/2001 | Gothait | |
| 6,569,373 B2 | 5/2003 | Napadensky | |
| 6,658,314 B1 | 12/2003 | Gothait | |
| 6,742,857 B2 | 6/2004 | Koshikawa et al. | |
| 6,850,334 B1 | 2/2005 | Gothait | |
| 6,877,848 B2 | 4/2005 | Shimzu et al. | |
| D530,365 S | 10/2006 | Wakayama et al. | |
| 7,183,335 B2 | 2/2007 | Napadensky | |
| 7,209,797 B2 | 4/2007 | Kritchman et al. | |
| 7,225,045 B2 | 5/2007 | Gothait et al. | |
| 7,300,619 B2 | 11/2007 | Napadensky et al. | |
| D579,492 S | 10/2008 | Matsumoto | |
| 7,479,510 B2 | 1/2009 | Napadensky et al. | |
| D587,749 S | 3/2009 | Perrill et al. | |
| 7,500,846 B2 | 3/2009 | Eshed et al. | |
| D590,439 S | 4/2009 | Kikuchi et al. | |
| 7,658,976 B2 | 2/2010 | Kritchman | |
| D612,416 S | 3/2010 | Harada | |
| D613,333 S | 4/2010 | Tamaki | |
| D617,376 S | 6/2010 | Lecheheb et al. | |
| D634,362 S | 3/2011 | Inoue | |
| D634,777 S | 3/2011 | Perrill et al. | |
| 7,962,237 B2 | 6/2011 | Kritchman | |
| 7,996,101 B2 | 8/2011 | Menchik et al. | |
| D667,491 S | 9/2012 | Williamson et al. | |
| 9,533,302 B2 | 1/2017 | Edelen et al. | |
| D788,195 S | 5/2017 | Liu et al. | |
| D791,868 S | 7/2017 | Hayashi et al. | |
| 9,718,238 B2 | 8/2017 | Teken et al. | |
| 2005/0131104 A1 | 6/2005 | Aikawa et al. | |
| 2010/0208016 A1 | 8/2010 | Menchik et al. | |
| 2012/0200647 A1 | 8/2012 | Miyashita et al. | |
| 2016/0009007 A1 | 1/2016 | Araki et al. | |

FOREIGN PATENT DOCUMENTS

| | | |
|---|---|---|
| EP | 2796383 | 10/2014 |
| JP | 2009-166359 | 7/2009 |
| JP | 2016-019930 | 2/2016 |
| JP | 2017-501910 | 1/2017 |
| JP | 2018-538187 | 12/2018 |
| WO | WO 2015/073301 | 5/2015 |
| WO | WO 2016/009426 | 1/2016 |
| WO | WO 2017/079774 | 5/2017 |
| WO | WO 2021/001827 | 1/2021 |

OTHER PUBLICATIONS

Ex Parte Quayle Action Dated Jun. 30, 2021 from the US Patent and Trademark Office Re. U.S. Appl. No. 29/697,170. (13 pages).
Examination Report Dated Jan. 9, 2020 From the European Patent Office Re. Application No. 7433800-0001. (2 Pages).
Examination Report Dated May 26, 2021 From the Innovation, Science and Economic Development Canada, Canadian Intellectual Property Office Re. Application No. 192304. (1 Page).
International Preliminary Report on Patentability Dated Jan. 13, 2022 From the International Bureau of WIPO Re. Application No. PCT/IL2020/050734. (14 Pages).
International Search Report and the Written Opinion Dated Dec. 18, 2020 From the International Searching Authority Re. Application No. PCT/1L2020/050734. (21 Pages).
Invitation to Pay Additional Fees, Communication Relating to the Results of the Partial International Search and the Provisional Opinion Dated Oct. 19, 2020 From the International Searching Authority Re. Application No. PCT/IL2020/050734. (13 Pages).
Notice of Allowance Dated Jan. 13, 2022 from US Patent and Trademark Office Re. U.S. Appl. No. 29/697,170 (7 pages).
Notice of Preliminary Refusal Dated Oct. 6, 2020 From the Korean Intellectual Property Office Re. Application No. 30-2020-0000193 and Its Translation Into English. (3 Pages).
Office Action Dated Jul. 20, 2020 from the Israel Patent Office Re. Application No. 64556. (2 Pages).
Objet30 Pro "Refill Stratasys Polyjet Photopolymers"; Objet30 Pro, Oct. 2020.
Notice of Reasons for Rejection Dated Mar. 19, 2024 From the Japan Patent Office Re. Application No. 2021-573968. (2 Pages).
Translation Dated Apr. 15, 2024 of Notice of Reasons for Rejection Dated Mar. 19, 2024 From the Japan Patent Office Re. Application No. 2021-573968. (2 Pages).
Office Action Dated Oct. 1, 2024 From the Israel Patent Office Re. Application No. 289570. (4 Pages).

* cited by examiner

METHOD AND SYSTEM FOR MONITORING AMOUNT OF SUPPLY MATERIAL IN ADDITIVE MANUFACTURING

RELATED APPLICATIONS

This application is a National Phase of PCT Patent Application No. PCT/IL2020/050734 having International filing date of Jul. 1, 2020, which claims the benefit of priority under 35 USC § 119 (e) of U.S. Provisional Patent Application No. 62/870,700 filed on Jul. 4, 2019. The contents of the above applications are all incorporated by reference as if fully set forth herein in their entirety.

FIELD AND BACKGROUND OF THE INVENTION

The present invention, in some embodiments thereof, relates to additive manufacturing and, more particularly, but not exclusively, to a method and a system for monitoring amount of supply material in additive manufacturing.

Additive manufacturing (AM) is generally a process in which a three-dimensional (3D) object is manufactured utilizing a computer model of the objects. Such a process is used in various fields, such as design related fields for purposes of visualization, demonstration and mechanical prototyping, as well as for rapid manufacturing.

The basic operation of any additive manufacturing system consists of slicing a three-dimensional computer model into thin cross sections, translating the result into two-dimensional position data and feeding the data to control equipment which manufacture a three-dimensional structure in a layerwise manner.

Additive manufacturing entails many different approaches to the method of fabrication, including three-dimensional printing, laminated object manufacturing, fused deposition modeling and others.

In three-dimensional printing processes, for example, a building material is dispensed from a print head having a set of nozzles to form layers of deposited material on a supporting structure. Depending on the building material, the layers may then be cured or solidified using a suitable device. The building material may include modeling material, which forms the object, and support material, which supports the object as it is being built. Various three-dimensional printing techniques exist and are disclosed in, e.g., U.S. Pat. Nos. 6,259,962, 6,569,373, 6,658,314, 6,850,334, 7,183,335 7,209,797, 7,225,045, 7,300,619, 7,479,510, 7,500,846, 7,658,976, 7,962,237, 7,996,101, and 9,718,238 all of the same Assignee, the contents of which are hereby incorporated by reference.

U.S. Pat. No. 7,996,101 discloses a cartridge for supplying building material to a 3D printing system, which includes a sensor to measure the weight, volume or mass of building material in the cartridge. The sensor can be a load cell, a volume sensor or a mass sensor.

SUMMARY OF THE INVENTION

According to an aspect of some embodiments of the present invention there is provided a method of monitoring an amount of building material in a cartridge supplying the building material to an additive manufacturing system. The method comprises introducing gas into the cartridge and measuring the pressure within the cartridge. When the pressure reaches a predetermined level, the method determines the amount of building material in the cartridge based on a volume of gas introduced into the cartridge or on a proxy of the volume.

According to some embodiments of the invention the gas is introduced at a predetermined volumetric flow rate, and the method comprises measuring a time interval from a beginning of the introduction of the gas to a time point at which the pressure reaches the predetermined level, and determining the amount of building material in the cartridge based on the time interval.

According to some embodiments of the invention the method comprises measuring a mass of gas introduced into the cartridge, and determining the amount of building material in the cartridge based on the mass.

According to some embodiments of the invention the cartridge comprises a vent, wherein the introducing the gas is via the vent.

According to some embodiments of the invention the method comprises reducing pressure in the cartridge, prior to the introduction of the gas into the cartridge.

According to some embodiments of the invention the gas is introduced via a manifold into the cartridge and into at least one additional cartridge, wherein the method comprises measuring the pressure and determining the amount of building material also in the at least one additional cartridge.

According to some embodiments of the invention the pressure is measured at a location selected from the group consisting of: an outlet of the manifold, an inlet of the cartridges, and at an interior of the cartridges.

According to some embodiments of the invention the pressure measurement and the determination of the amount of building material in the cartridges is executed simultaneously.

According to some embodiments of the invention the pressure measurement and the determination of the amount of building material in the cartridges is executed sequentially.

According to some embodiments of the invention the method is executed while building material flows out of the cartridge to be dispensed by the additive manufacturing system.

According to some embodiments of the invention the method executed before or after building material flows out of the cartridge to be dispensed by the additive manufacturing system.

According to some embodiments of the invention the method comprises issuing an alert when the amount of building material in the cartridges is less than a predetermined amount.

According to an aspect of some embodiments of the present invention there is provided a method of manufacturing an object. The method comprises supplying a building material formulation from a cartridge to a dispensing head, dispensing the building material formulation to sequentially form a plurality of layers in a configured pattern corresponding to a shape of the object, and monitoring amount of building material in a cartridge as delineated hereinabove and optionally and preferably as further exemplified below.

According to an aspect of some embodiments of the present invention there is provided a computerized controller for additive manufacturing system having a dispensing head for dispensing building material received from a cartridge, a pump for introducing gas into the cartridge, and a pressure sensor sensing pressure within the cartridge. The computerized controller comprises a circuit configured for controlling the dispensing head and the pump to execute the method for manufacturing an object as delineated hereinabove and optionally and preferably as further exemplified below.

According to an aspect of some embodiments of the present invention there is provided an additive manufacturing system for manufacturing an object in layers. The system comprises a dispensing head for dispensing building material received from a cartridge, a pump for introducing gas into the cartridge, a pressure sensor for sensing pressure within the cartridge, and a controller configured for monitoring the pressure, and, when the pressure reaches a predetermined level, determining an amount of building material in the cartridge, based on a volume of gas introduced into the cartridge or based on a proxy of the volume.

According to some embodiments of the invention the pump is configured for introducing the gas at a predetermined volumetric flow rate, and the controller is configured for measuring a time interval from a beginning of the introduction of the gas to a time point at which the pressure reaches the predetermined level, and determining the amount of building material in the cartridge based on the time interval.

According to some embodiments of the invention the controller is configured for measuring a mass of gas introduced into the cartridge, and for determining the amount of building material in the cartridge based on the mass.

According to some embodiments of the invention the controller is configured for controlling the pump to reduce pressure in the cartridge prior to the introduction of the gas into the cartridge.

According to some embodiments of the invention the system comprises at least one additional cartridge, and a manifold in fluid communication with the pump and the cartridges, and wherein the controller is configured for determining the amount of building material also in the at least one additional cartridge.

According to some embodiments of the invention the controller is configured to transmit operation signals to the pump to introduce the gas into the cartridge while building material flows out of the cartridge to be dispensed by the dispensing head.

According to some embodiments of the invention the controller is configured to transmit operation signals to the head to the pump to introduce the gas into the cartridge during time period at which the dispensing head does not dispense building material.

According to some embodiments of the invention the cartridge comprises a vent and wherein the pump introduces the gas via the vent.

According to some embodiments of the invention the cartridge comprises a building material outlet having a pierceable septum and a pierceable cup, wherein the pierceable cup encloses the septum in a manner that when the septum is pierced by a needle, a further motion of the needle through the septum allows the needle to pass through the cup to contact the liquid material and to establish fluid communication between the liquid material and an exterior of the cartridge. According to some embodiments of the invention the septum is made of an elastomeric material that is reactive with the liquid material, wherein the pierceable cup separates the liquid material from the septum prior to the passing of the needle through the pierceable cup.

According to some embodiments of the invention the controller is configured for issuing an alert when the amount of building material in the cartridges is less than a predetermined amount.

According to an aspect of some embodiments of the present invention there is provided a cartridge holding a liquid material. The cartridge comprises a housing containing the liquid material, and an outlet having a pierceable septum and a pierceable cup. The pierceable cup encloses the septum in a manner that when the septum is pierced by a needle, a further motion of the needle through the septum allows the needle to pass through the cup to contact the liquid material and to establish fluid communication between the liquid material and an exterior of the cartridge. According to some embodiments of the invention the septum is made of an elastomeric material that is reactive with the liquid material, wherein the pierceable cup separates the liquid material from the septum prior to the passing of the needle through the pierceable cup.

According to some embodiments of the invention the liquid in the cartridge is a building material for additive manufacturing.

According to some embodiments of the invention the elastomeric material is selected from the group consisting of natural rubber, synthetic rubber, latex, and silicone.

According to some embodiments of the invention the cartridge comprises a vent for establishing fluid communication between an interior of the cartridge and an environment outside the cartridge, for allowing gas to enter the cartridge.

According to some embodiments of the invention the vent comprises a pierceable septum and a pierceable cup, and is identical in structure to the outlet.

According to some embodiments of the invention the cartridge comprises a liquid material filling port covered by a filling port cover, wherein removal of the filling port cover causes the filling port cover to rupture.

According to some embodiments of the invention the cartridge comprises an identification tag providing computer-readable identification pertaining to at least one property of the cartridge.

According to some embodiments of the invention the identification provided by the identification tag comprises at least one of: an authenticity of the cartridge, a type of liquid material contained in the cartridge, an amount of liquid material contained in the cartridge at a time at which the identification is read from the tag, and a maximal amount of liquid material that the cartridge can contain.

According to some embodiments of the invention the identification tag is mounted on or integrated with the filling port cover.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1A:
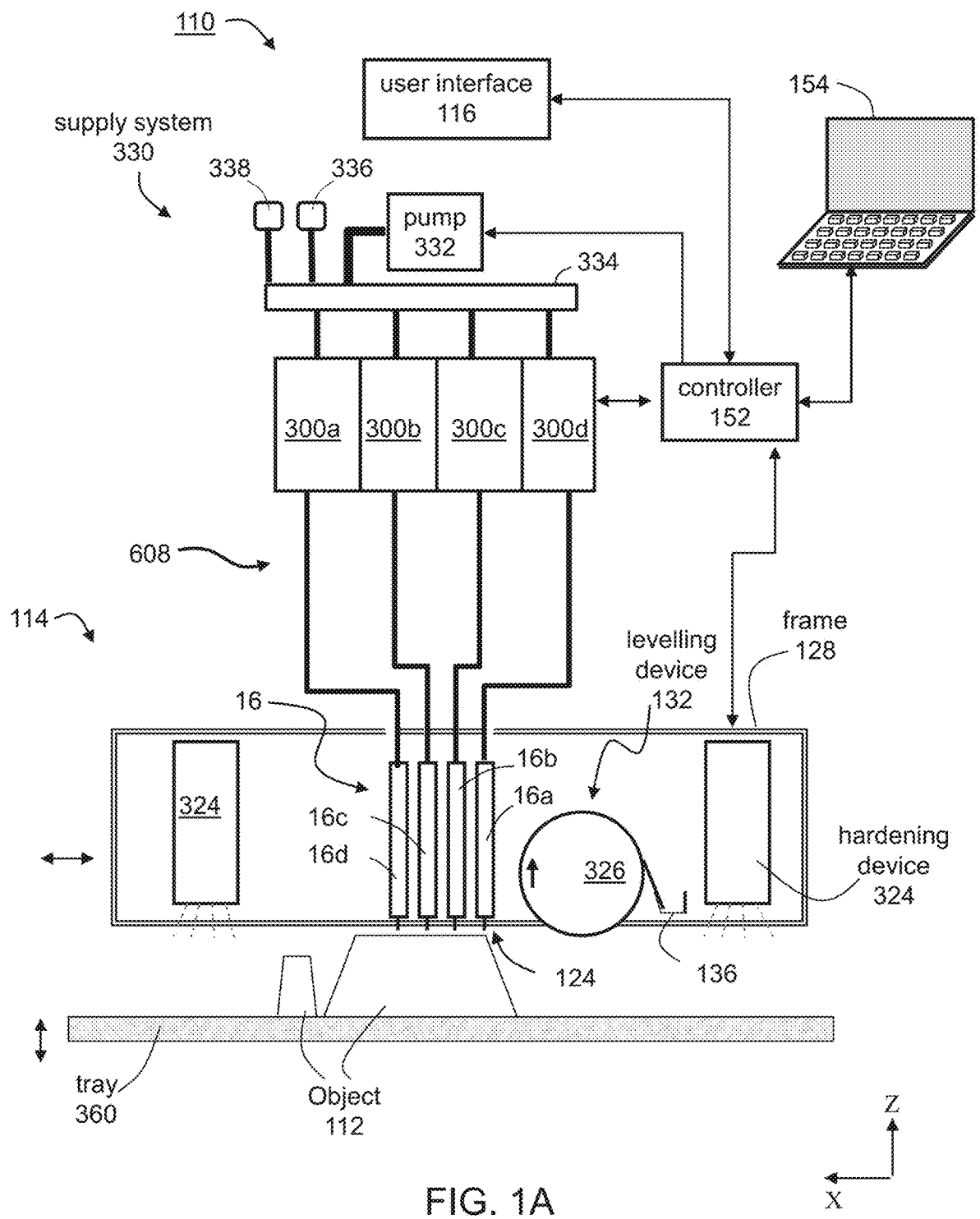
FIGS. 1A-D are schematic illustrations of an additive manufacturing system according to some embodiments of the invention.

The present invention, in some embodiments thereof, relates to additive manufacturing and, more particularly, but not exclusively, to a method and a system for monitoring an amount of supply material in additive manufacturing.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The method and system of the present embodiments manufacture three-dimensional objects based on computer object data in a layerwise manner by forming a plurality of layers in a configured pattern corresponding to the shape of the objects. The computer object data can be in any known format, including, without limitation, a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD).

The term "object" as used herein refers to a whole object or a part thereof.

Each layer is formed by additive manufacturing apparatus which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material formulation, and which type of building material formulation is to be delivered thereto. The decision is made according to a computer image of the surface.

In preferred embodiments of the present invention the AM comprises three-dimensional printing, more preferably three-dimensional inkjet printing. In these embodiments a building material formulation is dispensed from a dispensing head having a set of nozzles to deposit building material formulation in layers on a supporting structure. The AM apparatus thus dispenses building material formulation in target locations which are to be occupied and leaves other target locations void. The apparatus typically includes a plurality of dispensing heads, each of which can be configured to dispense a different building material formulation. Thus, different target locations can be occupied by different building material formulations. The types of building material formulations can be categorized into two major categories: modeling material formulation and support material formulation. The support material formulation serves as a supporting matrix or construction for supporting the object or object parts during the fabrication process and/or other purposes, e.g., providing hollow or porous objects. Support constructions may additionally include modeling material formulation elements, e.g. for further support strength.

The modeling material formulation is generally a composition which is formulated for use in additive manufacturing and which is able to form a three-dimensional object on its own, i.e., without having to be mixed or combined with any other substance.

Herein throughout, the phrase "uncured building material" collectively describes the materials that are dispensed during the fabrication process so as to sequentially form the layers, as described herein. This phrase encompasses uncured materials (also referred to herein as building material formulation(s)) dispensed so as to form the printed object, namely, one or more uncured modeling material formulation(s), and uncured materials dispensed so as to form the support, namely uncured support material formulations.

Herein, the dispensed materials are also referred to collectively as "material formulations". The material formulations provide, typically when hardened (unless indicated otherwise), typically hardened upon exposure to a curing condition as defined herein (unless indicated otherwise), to form a respective material.

Herein throughout, the phrases "cured modeling material" and "hardened modeling material", which are used interchangeably, describe the part of the building material that forms a model object, as defined herein, upon exposing the dispensed building material to curing, and following removal of the support material. The cured or hardened modeling material can be a single hardened material or a mixture of two or more hardened materials, depending on the modeling material formulations used in the method, as described herein.

Herein throughout, the phrase "modeling material formulation", which is also referred to herein interchangeably as "modeling formulation", describes a part of the uncured building material which is dispensed so as to form the model object, as described herein. The modeling formulation is an uncured modeling formulation, which, upon exposure to a curing condition, forms the final object or a part thereof.

An uncured building material can comprise one or more modeling formulations, and can be dispensed such that different parts of the model object are made upon curing different modeling formulations, and hence are made of different cured modeling materials or different mixtures of cured modeling materials.

Herein throughout, the phrase "hardened support material" is also referred to herein interchangeably as "cured support material" or simply as "support material" and describes the part of the building material that is intended to support the fabricated final object during the fabrication process, and which is removed once the process is completed and a hardened modeling material is obtained.

Herein throughout, the phrase "support material formulation", which is also referred to herein interchangeably as "support formulation" or simply as "formulation", describes a part of the uncured building material which is dispensed so as to form the support material, as described herein. The support material formulation is an uncured formulation. When a support material formulation is a curable formulation, it forms, upon exposure to a curing condition, a hardened support material.

Support materials, which can be either liquid materials or hardened, typically gel materials, are also referred to herein as sacrificial materials, which are removable after layers are dispensed and exposed to a curing energy, to thereby expose the shape of the final object.

Herein and in the art, the term "gel" describes a material, often referred to as a semi-solid material, which comprises a three-dimensional solid network, typically made of fibrous structures chemically or physically linked therebetween, and a liquid phase encaged within this network. Gels are typically characterized by a consistency of a solid (e.g., are non-fluidic), and feature relatively low Tensile strength, relatively low Shear Modulus, e.g., lower than 100 kPa, and a Shear Loss Modulus to Shear Storage modulus (tan delta, G"/G') value lower than 1. Gels can be characterized as flowable when subjected to a positive pressure of at least 0.5 bar, preferably at least 1 bar, or higher, or, alternatively, as non-flowable when subject to a pressure lower than 1 bar or lower than 0.5 bar or of 0.3 bar or lower.

Currently practiced support materials typically comprise a mixture of curable and non-curable materials, and are also referred to herein as gel support material.

Currently practiced support materials are typically water miscible, or water-dispersible or water-soluble.

Herein throughout, the term "water-miscible" describes a material which is at least partially dissolvable or dispersible in water, that is, at least 50% of the molecules move into the water upon mixture. This term encompasses the terms "water-soluble" and "water dispersible".

Herein throughout, the term "water-soluble" describes a material that when mixed with water in equal volumes or weights, a homogeneous solution is formed.

Herein throughout, the term "water-dispersible" describes a material that forms a homogeneous dispersion when mixed with water in equal volumes or weights.

Herein throughout, the phrase "dissolution rate" describes a rate at which a substance is dissolved in a liquid medium. Dissolution rate can be determined, in the context of the present embodiments, by the time needed to dissolve a certain amount of a support material. The measured time is referred to herein as "dissolution time".

The final three-dimensional object is made of the modeling material or a combination of modeling materials or modeling and support materials or modification thereof (e.g., following curing). All these operations are well-known to those skilled in the art of solid freeform fabrication.

In some exemplary embodiments of the invention an object is manufactured by dispensing one or more different modeling material formulations. When more than one modeling material formulation is used, each material formulation is optionally and preferably dispensed from a different array of nozzles (belonging to the same or distinct dispensing heads) of the AM apparatus.

In some embodiments, the dispensing head of the AM apparatus is a multi-channels dispensing head, in which case different modeling material formulations can be dispensed from two or more arrays of nozzles that are located in the same multi-channels dispensing head. In some embodiments, arrays of nozzles that dispense different modeling material formulations are located in separate dispensing heads, for example, a first array of nozzles dispensing a first modeling material formulation is located in a first dispensing head, and a second array of nozzles dispensing a second modeling material formulation is located in a second dispensing head.

In some embodiments, an array of nozzles that dispense a modeling material formulation and an array of nozzles that dispense a support material formulation are both located in the same multi-channels dispensing head. In some embodiments, an array of nozzles that dispense a modeling material formulation and an array of nozzles that dispense a support material formulation are located in separate dispensing heads.

The material formulations are optionally and preferably deposited in layers during the same pass of the printing heads. The material formulations and combination of material formulations within the layer are selected according to the desired properties of the object.

Figure 2A:
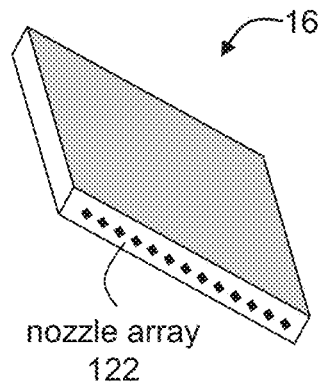
FIGS. 2A-2C are schematic illustrations of printing heads according to some embodiments of the present invention.
Figure 2B:
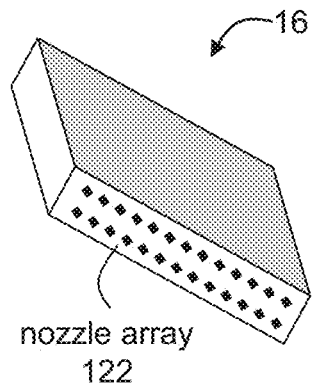
Figure 2C:
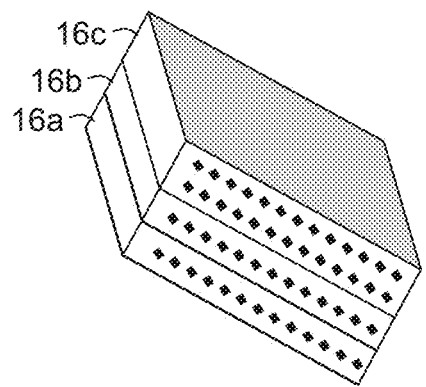

A representative and non-limiting example of a system 110 suitable for AM of an object 112 according to some embodiments of the present invention is illustrated in FIG. 1A. System 110 comprises an additive manufacturing apparatus 114 having a dispensing unit 16 which comprises a plurality of dispensing heads. Each head preferably comprises an array of one or more nozzles 122, as illustrated in FIGS. 2A-C described below, through which a liquid building material formulation 124 is dispensed.

Preferably, but not obligatorily, apparatus 114 is a three-dimensional printing apparatus, in which case the dispensing heads are printing heads, and the building material formulation is dispensed via inkjet technology. This need not necessarily be the case, since, for some applications, it may not be necessary for the additive manufacturing apparatus to employ three-dimensional printing techniques. Representative examples of additive manufacturing apparatus contemplated according to various exemplary embodiments of the present invention include, without limitation, fused deposition modeling apparatus and fused material formulation deposition apparatus.

Each dispensing head is optionally and preferably fed via a building material formulation reservoir which may optionally include a temperature control unit (e.g., a temperature sensor and/or a heating device), and a material formulation level sensor. To dispense the building material formulation, a voltage signal is applied to the dispensing heads to selectively deposit droplets of material formulation via the dispensing head nozzles, for example, as in piezoelectric inkjet printing technology. The dispensing rate of each head depends on the number of nozzles, the type of nozzles and the applied voltage signal rate (frequency). Such dispensing heads are known to those skilled in the art of solid freeform fabrication.

Preferably, but not obligatorily, the overall number of dispensing nozzles or nozzle arrays is selected such that half of the dispensing nozzles are designated to dispense support material formulation and half of the dispensing nozzles are designated to dispense modeling material formulation, i.e. the number of nozzles jetting modeling material formulations is the same as the number of nozzles jetting support material formulation. In the representative example of FIG. 1A, four dispensing heads 16a, 16b, 16c and 16d are illustrated. Each of heads 16a, 16b, 16c and 16d has a nozzle array. In this Example, heads 16a and 16b can be designated for modeling material formulation/s and heads 16c and 16d can be designated for support material formulation. Thus, head 16a can dispense a first modeling material formulation, head 16b can dispense a second modeling material formulation and heads 16c and 16d can both dispense support material formulation. In an alternative embodiment, heads 16c and 16d, for example, may be combined in a single head having two nozzle arrays for depositing support material formulation. In a further alternative embodiment any one or more of the dispensing heads may have more than one nozzle arrays for dispensing more than one material formulation, e.g. two nozzle arrays for dispensing two different modeling material formulations or a modeling material formulation and a support material formulation, each formulation via a different array or number of nozzles.

Yet it is to be understood that it is not intended to limit the scope of the present invention and that the number of modeling material formulation depositing heads (modeling heads) and the number of support material formulation depositing heads (support heads) may differ. Generally, the number of modeling heads, the number of support heads and the number of nozzles in each respective head or head array are selected such as to provide a predetermined ratio, a, between the maximal dispensing rate of the support material formulation and the maximal dispensing rate of modeling material formulation. The value of the predetermined ratio, a, is preferably selected to ensure that in each formed layer, the height of modeling material formulation equals the height of support material formulation. Typical values for a are from about 0.6 to about 1.5. As used herein the term "about" refers to ±10%.

For example, for a=1, the overall dispensing rate of support material formulation is generally the same as the overall dispensing rate of the modeling material formulation when all modeling heads and support heads operate.

In a preferred embodiment, there are M modeling heads each having m arrays of p nozzles, and S support heads each having s arrays of q nozzles such that M×m×p=S×s×q. Each of the M×m modeling arrays and S×s support arrays can be manufactured as a separate physical unit, which can be assembled and disassembled from the group of arrays. In this embodiment, each such array optionally and preferably comprises a temperature control unit and a material formulation level sensor of its own, and receives an individually controlled voltage for its operation.

Apparatus 114 can further comprise a solidifying device 324 which can include any device configured to emit light, heat or the like that may cause the deposited material formulation to harden. For example, solidifying device 324 can comprise one or more radiation sources, which can be, for example, an ultraviolet or visible or infrared lamp, or other sources of electromagnetic radiation, or electron beam source, depending on the modeling material formulation being used. In some embodiments of the present invention, solidifying device 324 serves for curing or solidifying the modeling material formulation.

The dispensing head and radiation source are preferably mounted in a frame or block 128 which is preferably operative to reciprocally move over a tray 360, which serves as the working surface. In some embodiments of the present invention the radiation sources are mounted in the block such that they follow in the wake of the dispensing heads to at least partially cure or solidify the material formulations just dispensed by the dispensing heads. Tray 360 is positioned horizontally. According to the common conventions an X-Y-Z Cartesian coordinate system is selected such that the X-Y plane is parallel to tray 360. Tray 360 is preferably configured to move vertically (along the Z direction), typically downward. In various exemplary embodiments of the invention, apparatus 114 further comprises one or more leveling devices 132, e.g. a roller 326. Leveling device 326 serves to straighten, level and/or establish a thickness of the newly formed layer prior to the formation of the successive layer thereon. Leveling device 326 preferably comprises a waste collection device 136 for collecting the excess material formulation generated during leveling. Waste collection device 136 may comprise any mechanism that delivers the material formulation to a waste tank or waste cartridge.

In use, the dispensing heads of unit 16 move in a scanning direction, which is referred to herein as the X direction, and selectively dispense building material formulation in a predetermined configuration in the course of their passage over tray 360. The building material formulation typically comprises one or more types of support material formulation and one or more types of modeling material formulation. The passage of the dispensing heads of unit 16 is followed by the curing of the modeling material formulation(s) by radiation source 126. In the reverse passage of the heads, back to their starting point for the layer just deposited, an additional dispensing of building material formulation may be carried out, according to predetermined configuration. In the forward and/or reverse passages of the dispensing heads, the layer thus formed may be straightened by leveling device 326, which preferably follows the path of the dispensing heads in their forward and/or reverse movement. Once the dispensing heads return to their starting point along the X direction, they may move to another position along an indexing direction, referred to herein as the Y direction, and continue to build the same layer by reciprocal movement along the X direction. Alternately, the dispensing heads may move in the Y direction between forward and reverse movements or after more than one forward-reverse movement. The series of scans performed by the dispensing heads to complete a single layer is referred to herein as a single scan cycle.

Once the layer is completed, tray 360 is lowered in the Z direction to a predetermined Z level, according to the desired thickness of the layer subsequently to be printed. The procedure is repeated to form three-dimensional object 112 in a layerwise manner.

In another embodiment, tray 360 may be displaced in the Z direction between forward and reverse passages of the dispensing head of unit 16, within the layer. Such Z displacement is carried out in order to cause contact of the leveling device with the surface in one direction and prevent contact in the other direction.

System 110 optionally and preferably comprises a building material formulation supply system 330 which comprises the building material formulation containers or cartridges and supplies a plurality of building material formulations to fabrication apparatus 114. Four cartridges 300a, 300b, 300c and 300d are illustrated in FIG. 1A, but any number of cartridges can be included in supply system 330.

A controller 152 controls fabrication apparatus 114 and optionally and preferably also supply system 330. Controller 152 can be a computerized controller having an electronic circuit and a non-volatile memory medium readable by the circuit, wherein the memory medium stores program instructions which, when read by the circuit, cause the circuit to perform control operations as further detailed below. In some embodiments of the present invention the electronic circuit of controller 152 is also configured for performing data processing operations. Controller 152 preferably communicates with a data processor 154 which transmits digital data pertaining to fabrication instructions based on computer object data, e.g., a CAD configuration represented on a computer readable medium in a form of a Standard Tessellation Language (STL) format or the like. Typically, controller 152 controls the voltage applied to each dispensing head or nozzle array and the temperature of the building material formulation in the respective printing head.

Once the manufacturing data is loaded to controller 152 it can operate without user intervention. In some embodiments, controller 152 receives additional input from the operator, e.g., using data processor 154 or using a user interface 116 communicating with unit 152. User interface 116 can be of any type known in the art, such as, but not limited to, a keyboard, a touch screen and the like. For example, controller 152 can receive, as additional input, one or more building material formulation types and/or attributes, such as, but not limited to, color, characteristic distortion and/or transition temperature, viscosity, electrical property, magnetic property. Other attributes and groups of attributes are also contemplated.

Figure 1B:
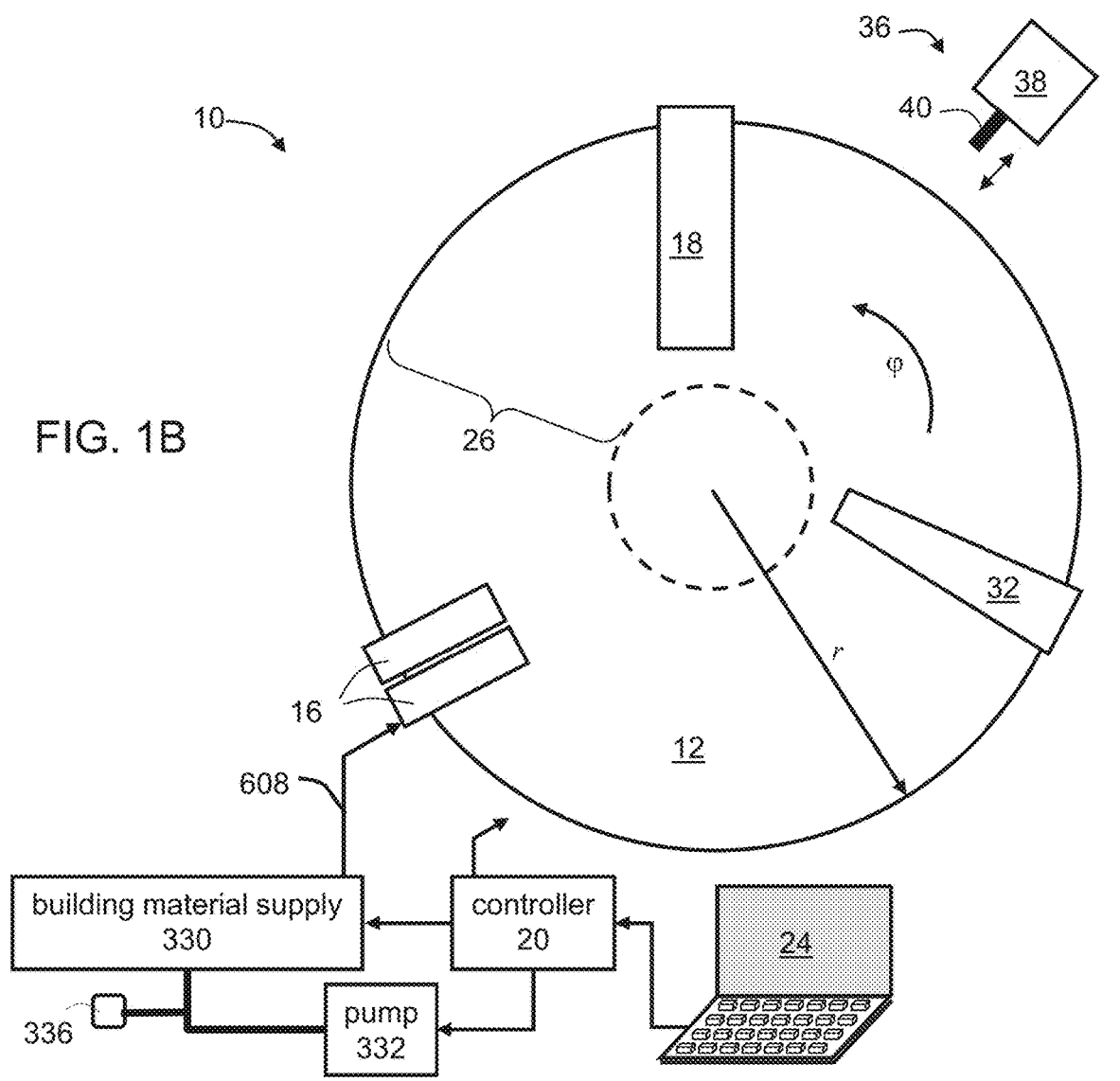
Figure 1C:
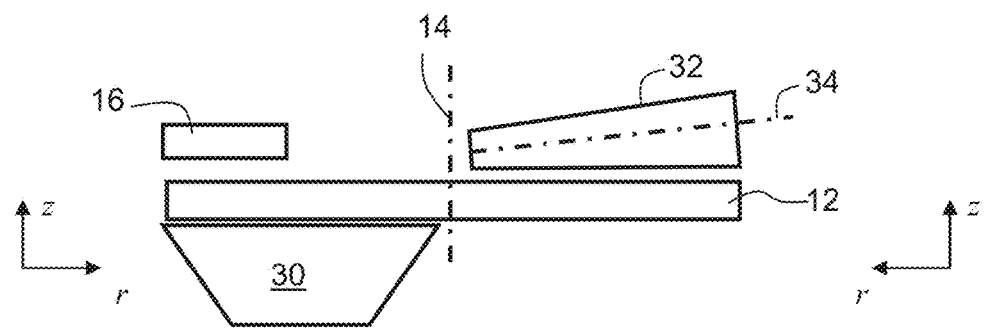
Figure 1D:
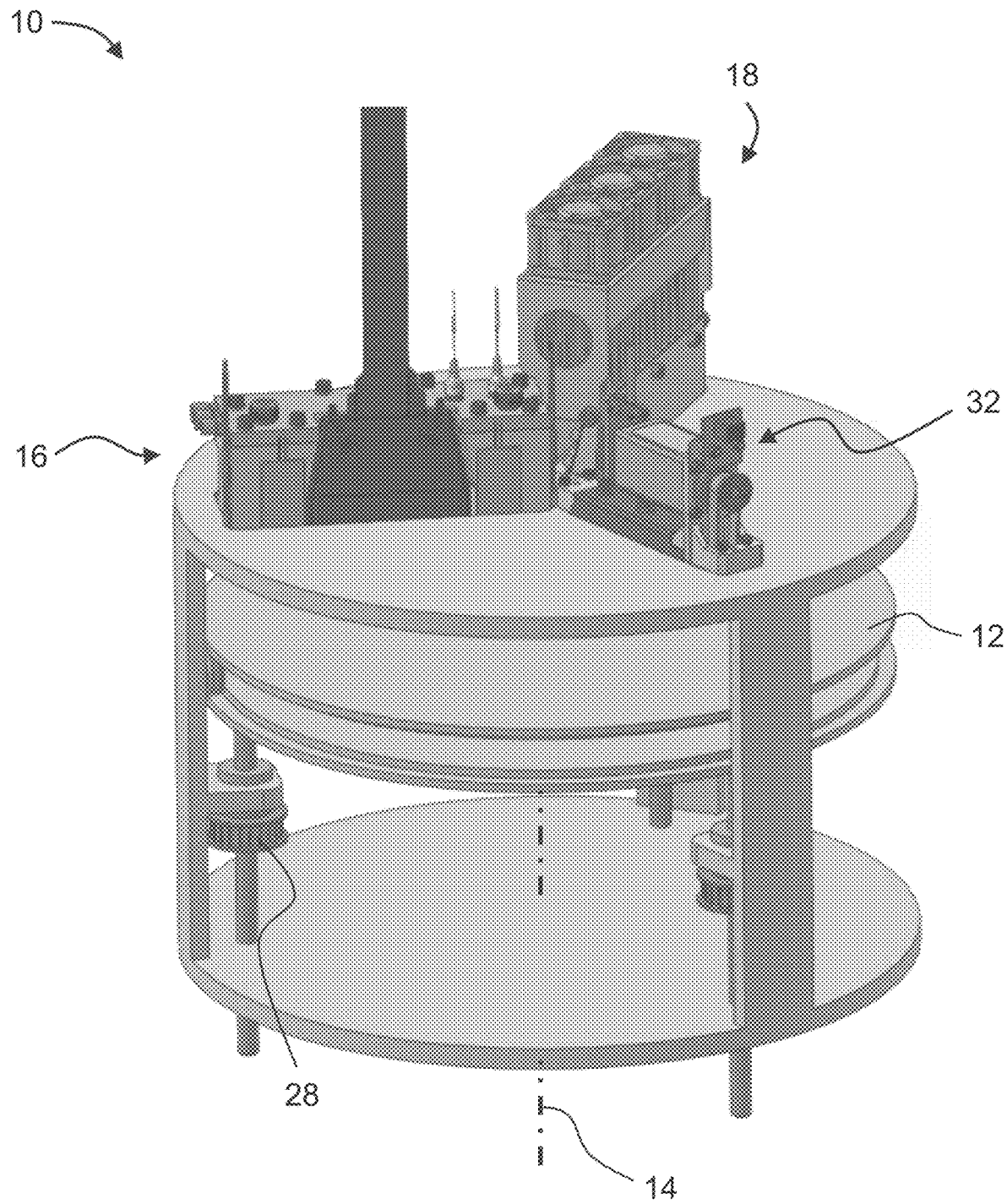

Another representative and non-limiting example of a system 10 suitable for AM of an object according to some embodiments of the present invention is illustrated in FIGS. 1B-D. FIGS. 1B-D illustrate a top view (FIG. 1B), a side view (FIG. 1C) and an isometric view (FIG. 1D) of system 10.

In the present embodiments, system 10 comprises a tray 12 and a plurality of inkjet printing heads 16, each having a plurality of separated nozzles, and arranged to receive building material formulation from supply system 330. Tray 12 can have a shape of a disk or it can be annular. Non-round shapes are also contemplated, provided they can be rotated about a vertical axis.

Tray 12 and heads 16 are optionally and preferably mounted such as to allow a relative rotary motion between tray 12 and heads 16. This can be achieved by (i) configuring tray 12 to rotate about a vertical axis 14 relative to heads 16, (ii) configuring heads 16 to rotate about vertical axis 14 relative to tray 12, or (iii) configuring both tray 12 and heads 16 to rotate about vertical axis 14 but at different rotation velocities (e.g., rotation at opposite direction). While the embodiments below are described with a particular emphasis to configuration (i) wherein the tray is a rotary tray that is configured to rotate about vertical axis 14 relative to heads 16, it is to be understood that the present application contemplates also configurations (ii) and (iii). Any one of the embodiments described herein can be adjusted to be applicable to any of configurations (ii) and (iii), and one of ordinary skills in the art, provided with the details described herein, would know how to make such adjustment.

In the following description, a direction parallel to tray 12 and pointing outwardly from axis 14 is referred to as the radial direction r, a direction parallel to tray 12 and perpendicular to the radial direction r is referred to herein as the azimuthal direction $\varphi$, and a direction perpendicular to tray 12 is referred to herein is the vertical direction z.

The term "radial position," as used herein, refers to a position on or above tray 12 at a specific distance from axis 14. When the term is used in connection to a printing head, the term refers to a position of the head which is at specific distance from axis 14. When the term is used in connection to a point on tray 12, the term corresponds to any point that belongs to a locus of points that is a circle whose radius is the specific distance from axis 14 and whose center is at axis 14.

The term "azimuthal position," as used herein, refers to a position on or above tray 12 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersect the vertical axis 14 at a specific point.

Tray 12 serves as a supporting structure for three-dimensional printing. The working area on which one or objects are printed is typically, but not necessarily, smaller than the total area of tray 12. In some embodiments of the present invention the working area is annular. The working area is shown at 26. In some embodiments of the present invention tray 12 rotates continuously in the same direction throughout the formation of object, and in some embodiments of the present invention tray reverses the direction of rotation at least once (e.g., in an oscillatory manner) during the formation of the object. Tray 12 is optionally and preferably removable. Removing tray 12 can be for maintenance of system 10, or, if desired, for replacing the tray before printing a new object. In some embodiments of the present invention system 10 is provided with one or more different replacement trays (e.g., a kit of replacement trays), wherein two or more trays are designated for different types of objects (e.g., different weights) different operation modes (e.g., different rotation speeds), etc. The replacement of tray 12 can be manual or automatic, as desired. When automatic replacement is employed, system 10 comprises a tray replacement device 36 configured for removing tray 12 from its position below heads 16 and replacing it by a replacement tray (not shown). In the representative illustration of FIG. 1B tray replacement device 36 is illustrated as a drive 38 with a movable arm 40 configured to pull tray 12, but other types of tray replacement devices are also contemplated.

Exemplified embodiments for the printing head 16 are illustrated in FIGS. 2A-2C. These embodiments can be employed for any of the AM systems described above, including, without limitation, system 110 and system 10.

FIGS. 2A-B illustrate a printing head 16 with one (FIG. 2A) and two (FIG. 2B) nozzle arrays 22. The nozzles in the array are preferably aligned linearly, along a straight line. In embodiments in which a particular printing head has two or more linear nozzle arrays, the nozzle arrays are optionally and preferably can be parallel to each other.

When a system similar to system 110 is employed, all printing heads 16 are optionally and preferably oriented along the indexing direction with their positions along the scanning direction being offset to one another.

When a system similar to system 10 is employed, all printing heads 16 are optionally and preferably oriented radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position $\varphi_1$, and another head can be oriented radially and positioned at azimuthal position $\varphi_2$. In this example, the azimuthal offset between the two heads is $\varphi_1-\varphi_2$, and the angle between the linear nozzle arrays of the two heads is also $\varphi_1-\varphi_2$.

In some embodiments, two or more printing heads can be assembled to a block of printing heads, in which case the printing heads of the block are typically parallel to each other. A block including several inkjet printing heads 16a, 16b, 16c is illustrated in FIG. 2C.

In some embodiments, system 10 comprises a support structure 30 positioned below heads 16 such that tray 12 is between support structure 30 and heads 16. Support structure 30 may serve for preventing or reducing vibrations of tray 12 that may occur while inkjet printing heads 16 operate. In configurations in which printing heads 16 rotate about axis 14, support structure 30 preferably also rotates such that support structure 30 is always directly below heads 16 (with tray 12 between heads 16 and tray 12).

Tray 12 and/or printing heads 16 is optionally and preferably configured to move along the vertical direction z, parallel to vertical axis 14 so as to vary the vertical distance between tray 12 and printing heads 16. In configurations in which the vertical distance is varied by moving tray 12 along the vertical direction, support structure 30 preferably also moves vertically together with tray 12. In configurations in which the vertical distance is varied by heads 16 along the vertical direction, while maintaining the vertical position of tray 12 fixed, support structure 30 is also maintained at a fixed vertical position.

The vertical motion can be established by a vertical drive 28. Once a layer is completed, the vertical distance between tray 12 and heads 16 can be increased (e.g., tray 12 is lowered relative to heads 16) by a predetermined vertical step, according to the desired thickness of the layer subsequently to be printed. The procedure is repeated to form a three-dimensional object in a layerwise manner.

The operation of inkjet printing heads 16 and optionally and preferably also of one or more other components of system 10, e.g., the motion of tray 12, are controlled by a controller 20. The controller can be a computerized controller having an electronic circuit and a non-volatile memory medium readable by the circuit, wherein the memory medium stores program instructions which, when read by the circuit, cause the circuit to perform control operations as further detailed below. In some embodiments of the present invention the electronic circuit of controller 20 is also configured for performing data processing operations.

Controller 20 can also communicate with a host computer 24 which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD). The object data formats are typically structured according to a Cartesian system of coordinates. In these cases, computer 24 preferably executes a procedure for transforming the coordinates of each slice in the computer object data from a Cartesian system of coordinates into a polar system of coordinates. Computer 24 optionally and preferably transmits the fabrication instructions in terms of the transformed system of coordinates. Alternatively, computer 24 can transmit the fabrication instructions in terms of the original system of coordinates as provided by the computer object data, in which case the transformation of coordinates is executed by the circuit of controller 20.

Figure 3A:
FIGS. 3A and 3B are schematic illustrations demonstrating coordinate transformations according to some embodiments of the present invention.
Figure 3B:
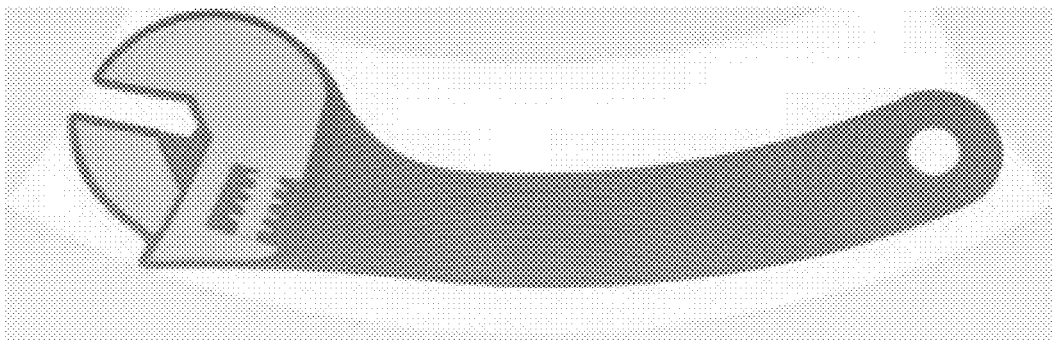

The transformation of coordinates allows three-dimensional printing over a rotating tray. In conventional three-dimensional printing, the printing heads reciprocally move above a stationary tray along straight lines. In such conventional systems, the printing resolution is the same at any point over the tray, provided the dispensing rates of the heads are uniform. Unlike conventional three-dimensional printing, not all the nozzles of the head points cover the same distance over tray 12 during at the same time. The transformation of coordinates is optionally and preferably executed so as to ensure equal amounts of excess material formulation at different radial positions. Representative examples of coordinate transformations according to some embodiments of the present invention are provided in FIGS. 3A-B, showing a slice of an object (each slice corresponds to fabrication instructions of a different layer of the objects), where FIG. 3A illustrates the slice in a Cartesian system of coordinates and FIG. 3B illustrates the same slice following an application of a transformation of coordinates procedure to the respective slice.

Typically, controller 20 controls the voltage applied to the respective component of the system 10 based on the fabrication instructions and based on the stored program instructions as described below.

Generally, controller 20 controls printing heads 16 to dispense, during the rotation of tray 12, droplets of building material formulation in layers, such as to print a three-dimensional object on tray 12.

System 10 optionally and preferably comprises one or more radiation sources 18, which can be, for example, an ultraviolet or visible or infrared lamp, or other sources of electromagnetic radiation, or electron beam source, depending on the modeling material formulation being used. Radiation source can include any type of radiation emitting device, including, without limitation, light emitting diode (LED), digital light processing (DLP) system, resistive lamp and the like. Radiation source 18 serves for curing or solidifying the modeling material formulation. In various exemplary embodiments of the invention the operation of radiation source 18 is controlled by controller 20 which may activate and deactivate radiation source 18 and may optionally also control the amount of radiation generated by radiation source 18.

In some embodiments of the invention, system 10 further comprises one or more leveling devices 32 which can be manufactured as a roller or a blade. Leveling device 32 serves to straighten the newly formed layer prior to the formation of the successive layer thereon. In some embodiments, leveling device 32 has the shape of a conical roller positioned such that its symmetry axis 34 is tilted relative to the surface of tray 12 and its surface is parallel to the surface of the tray. This embodiment is illustrated in the side view of system 10 (FIG. 1C).

The conical roller can have the shape of a cone or a conical frustum.

The opening angle of the conical roller is preferably selected such that is a constant ratio between the radius of the cone at any location along its axis 34 and the distance between that location and axis 14. This embodiment allows roller 32 to efficiently level the layers, since while the roller rotates, any point p on the surface of the roller has a linear velocity which is proportional (e.g., the same) to the linear velocity of the tray at a point vertically beneath point p. In some embodiments, the roller has a shape of a conical frustum having a height h, a radius $R_1$ at its closest distance from axis 14, and a radius $R_2$ at its farthest distance from axis 14, wherein the parameters h, $R_1$ and $R_2$ satisfy the relation $R_1/R_2=(R-h)/h$ and wherein R is the farthest distance of the roller from axis 14 (for example, R can be the radius of tray 12).

The operation of leveling device 32 is optionally and preferably controlled by controller 20 which may activate and deactivate leveling device 32 and may optionally also control its position along a vertical direction (parallel to axis 14) and/or a radial direction (parallel to tray 12 and pointing toward or away from axis 14.

In some embodiments of the present invention printing heads 16 are configured to reciprocally move relative to tray along the radial direction r. These embodiments are useful when the lengths of the nozzle arrays 22 of heads 16 are shorter than the width along the radial direction of the working area 26 on tray 12. The motion of heads 16 along the radial direction is optionally and preferably controlled by controller 20.

Some embodiments contemplate the fabrication of an object by dispensing different material formulations from different dispensing heads. These embodiments provide, inter alia, the ability to select material formulations from a given number of material formulations and define desired combinations of the selected material formulations and their properties. According to the present embodiments, the spatial locations of the deposition of each material formulation with the layer is defined, either to effect occupation of different three-dimensional spatial locations by different material formulations, or to effect occupation of substantially the same three-dimensional location or adjacent three-dimensional locations by two or more different material formulations so as to allow post deposition spatial combination of the material formulations within the layer, thereby to form a composite material formulation at the respective location or locations.

Any post deposition combination or mix of modeling material formulations is contemplated. For example, once a certain material formulation is dispensed it may preserve its original properties. However, when it is dispensed simultaneously with another modeling material formulation or other dispensed material formulations which are dispensed at the same or nearby locations, a composite material formulation having a different property or properties to the dispensed material formulations is formed.

The present embodiments thus enable the deposition of a broad range of material formulation combinations, and the fabrication of an object which may consist of multiple different combinations of material formulations, in different parts of the object, according to the properties desired to characterize each part of the object.

Further details on the principles and operations of an AM system suitable for the present embodiments are found in U.S. Published Application No. 20100191360, the contents of which are hereby incorporated by reference.

Oftentimes, it is desired to determine the amount of building material in the cartridge(s) of the supply system 330, for example, to cease the dispensing operation of one or more of head(s) 16 when a respective cartridge is empty, or to alert the user that the amount of material in the cartridge is low or insufficient for completing the build of the object. Conventional three-dimensional printing systems employ load cells for determining the amount of building material in the cartridge(s). Typically in such systems, the cartridges are housed in a cartridge nest provided with several separated load cells, one load cell for each cartridge in the nest. The load cells weigh each cartridge. The controller compares the measured weight to a known weight that is stored in a memory (e.g., a weight of the cartridge when full or a weight of an empty cartridge), and determine the amount of building material in the cartridge based on the difference between the measured weight and the known weight. The inventors found that his solution is less than optimal, because load cells are typically expensive, may require regular maintenance, and may also require damping their resonance frequencies. Another drawback of this solution is that it requires the number of load cells to be the same as the number of cartridges in the nest, resulting in a linear increase of the manufacturing costs of the system as a function of the number of cartridges.

In a search for a better solution to the problem of determining the amount of building material in the cartridge (s), the inventors devised a technique that is based on measuring the vacant volume within the cartridge(s), thus measuring a parameter that is complementary to the amount of building material. The advantage of this solution is in its simplicity and, as will be explained below, in that it can be optionally and preferably applied to more than one cartridge without incurring a linear increase of the manufacturing costs of the system.

Figure 4:
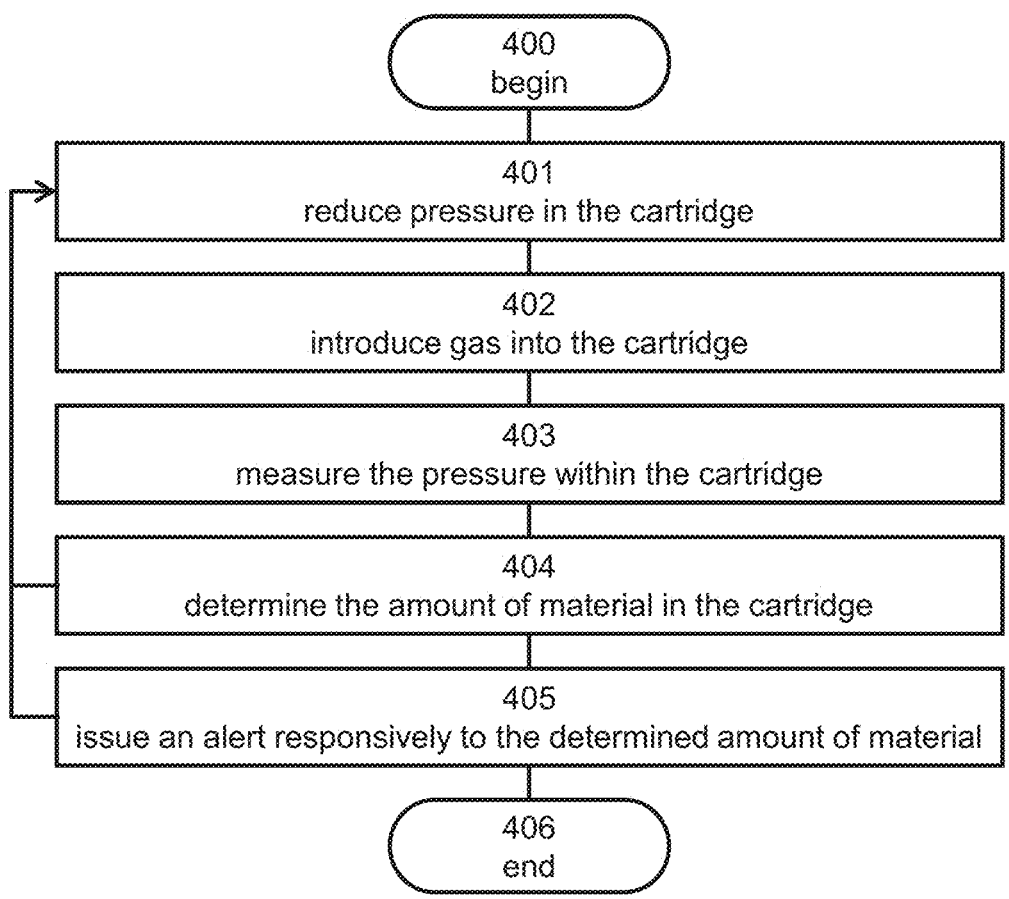
FIG. 4 is a flowchart diagram of a method suitable for monitoring amount of building material in a cartridge supplying the building material to an AM system, according to some embodiments of the present invention.
Figure 5:
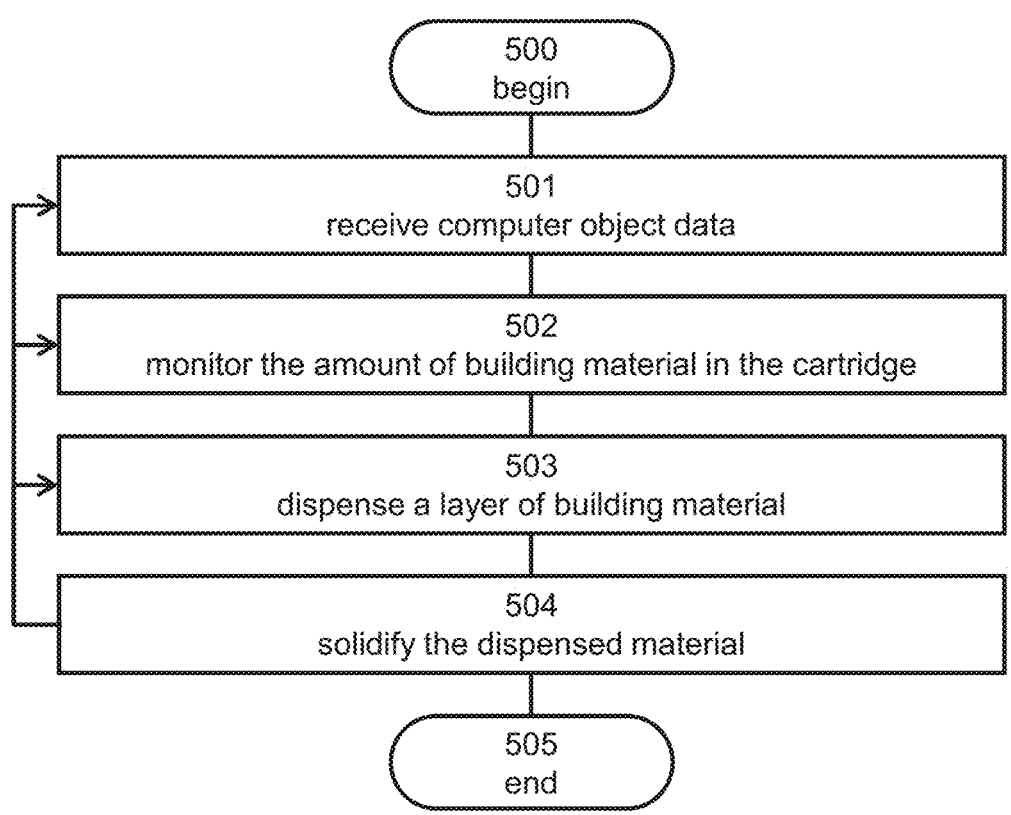
FIG. 5 is a flowchart diagram of a method suitable for manufacturing an object according to some embodiments of the present invention.

Referring now to again to the drawings, FIG. 4 is a flowchart diagram of a method suitable for monitoring the amount of building material in a cartridge supplying the building material to an AM system, and FIG. 5 is a flowchart diagram of a method suitable for manufacturing an object according to some embodiments of the present invention. The methods are typically executed using an AM system, such as, but not limited to, system 10 or system 110.

It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

Computer programs implementing the method can commonly be distributed to users on a distribution medium such as, but not limited to, a flash memory, CD-ROM, or a remote medium communicating with a local computer over the internet. From the distribution medium, the computer programs can be copied to a hard disk or a similar intermediate storage medium. The computer programs can be run by loading the computer instructions either from their distribution medium or their intermediate storage medium into the execution memory of the computer, configuring the computer to act in accordance with the method. All these operations are well-known to those skilled in the art of computer systems.

The method can be embodied in many forms. For example, it can be embodied on a tangible medium such as a computer for performing the method steps. It can be embodied on a computer readable medium, comprising computer readable instructions for carrying out the method steps. In can also be embodied in an electronic device having digital computer capabilities arranged to run the computer program on the tangible medium or execute the instruction on a computer readable medium.

With reference to FIG. 4, the method begins at 400 and optionally and preferably continues to 401 at which the gas pressure in the cartridge is reduced. This can be done for example by venting the anterior of the cartridge to atmosphere, or by actively pumping gas (e.g., air) out of the cartridge, using a pump 332 (see FIGS. 1A and 1B). Pump 332 can be connected directly to the respective cartridge, or, more preferably, it can be connected to a manifold 334 that provides fluid communication between pump 332 and each of cartridges 300a, 300b, etc., as illustrated in FIG. 1A. Optionally and preferably manifold 334 comprises an arrangement of controllable valves (not shown) that establish or prevent the fluid communication with a respective cartridge. Control signals to pump 332 and manifold 334 (if employed and controllable) are typically generated by the controller of the AM system. Preferably, the pressure is reduced to the ambient pressure.

The method proceeds to 402 at which a gas is introduced into the cartridge. The gas can be, for example, air or an inert gas, e.g., a noble gas, and is preferably introduced to the cartridge by pump 332, either directly or via manifold 334 as further detailed hereinabove. In embodiments in which manifold 334 is employed, the gas can be introduced simultaneously to two or more (e.g., all) the cartridges, or it can be introduced sequentially, each time to one of the cartridges.

At 403 the gas pressure within the cartridge is measured. The measurement is by means of a pressure sensor 336 in fluid communication with the respective cartridge. In some embodiments, each cartridge is associated with a separate pressure sensor 336. For example, a sensor can be provided within each of the cartridges, or be in fluid communication with a conduit leading to the interior of the cartridge. In these embodiments, the gas pressure in two or more cartridges can be measured simultaneously.

Alternatively, the same pressure sensor 336 can be used for more than one cartridge. For example, when the gas is introduced via manifold 334, pressure sensor 336 can be arranged to measure the pressure in manifold 334, thereby also in the cartridge that fluidly communicates with it. In these embodiments, the gas pressure in two or more cartridges can be measured sequentially, wherein each time the gas pressure in a different one of the cartridges is measured.

Typically, when the gas is introduced simultaneously, the gas pressure is also measured simultaneously, and when the gas is introduced sequentially, the gas pressure is also measured sequentially.

Sensing signals from sensor 336 are typically transmitted to the controller or processor of the AM system.

Operations 402 and 403 can be executed simultaneously or intermittently, as desired, and are optionally and preferably repeated or continued for each cartridge until the pressure within the cartridge reaches a predetermined level $P_t$ above the ambient pressure. The value of $P_t$ can be any value provided it does not exceed the pressure that can be maintained with the cartridge. Representative examples for suitable value for $P_t$ include, without limitation, any value from about 1 cmH$_2$O to about 10 cmH$_2$O. In experiments performed by the inventors $P_t$ was set to be 2 cmH$_2$O. Once the pressure within the cartridge reaches the predetermined level $P_t$ above the ambient pressure, operations 402, and optionally and preferably also 403, are ceased.

When the pressure reaches the predetermined level, the method proceeds to 404 at which the amount of building material in the cartridge is determined. Typically, the amount is determined based on a volume of the gas that is introduced into the cartridge at 402, or based on a proxy of this volume.

As used herein "a proxy of the volume" is defined as a parameter that correlates with the volume itself and that is other than the volume itself.

In some embodiments of the present invention the gas is introduced into the cartridge at a predetermined, and optionally and preferably also generally constant (e.g., with tolerance of ±10%), volumetric flow rate. In these embodiments, the volume of the gas that enters the cartridge correlates with the time interval during which the gas was introduced into the cartridge. Therefore, in these embodiments, the time interval Δt from a beginning of the introduction of the gas to a time point at which the pressure reaches the predetermined level is measured, and the amount of building material in the cartridge can be determined based on the value of the time interval Δt. The determination can be using a mathematical function expressing the amount of building material in the cartridge as a function of the time interval Δt. For example, the equation can be $v_M = v_C - Q\Delta t$, where $v_M$ is the volume of building material in the cartridge, $v_c$ is the volume of the cartridge, and Q is the volumetric flow rate at which the gas is introduced into the cartridge. Thus, in these embodiments the parameter Δt enacts the proxy of the volume of gas that is introduced to the cartridge.

In some embodiments of the present invention the mass $m_g$ of the gas introduced into the cartridge is measured. This can be done, for example, by a mass flow sensor 338 configured to sense the mass of gas flowing out of pump 332 into the cartridge. Mass flow sensor 338 can be positioned at the gas outlet of pump 332, or in fluid communication with manifold 334. Alternatively, a plurality of mass flow sensors can be employed, each in a separate fluid communication with one of the cartridges.

When the mass of the gas is measured, the amount of building material in the cartridge can be determined based on the measured mass. This can be done by a lookup table, or by a mathematical function expressing the amount of building material in the cartridge as a function of the mass of the gas. For example, the mathematical function can express the volume of the gas as a function of its mass in accordance with its equation of state, and then correlate the gas volume with the volume of the building material. Typically, the gas is approximated as an ideal gas, and the equation of state is the equation of state of an ideal gas, whereby, the volume of the gas is linearly proportional to the mass of the gas, assuming there is no change in the temperature of the gas within the cartridge during the time interval in which the gas is introduced to the cartridge. Thus, in these embodiments the parameter $m_g$ enacts the proxy of the volume of gas that is introduced to the cartridge.

Determination of the amount of building material in the cartridge based on the time interval parameter Δt is preferred from the standpoint of cost since it does not require a mass flow sensor. Determination of the amount of building material in the cartridge based on the mass parameter $m_g$ is advantageous since it does not require operating the pump at a predetermined volumetric flow rate.

When the controller of the AM system is a computerized controller, the determination 406 can be executed by the controller. Alternatively, the determination 406 can be executed by the processor or host computer of the AM system.

Optionally, the method proceeds to 405 at which an alert is issued responsively to the determination 405. For example, an alert can be issued when the cartridge is empty, or when the amount of material in the cartridge is less than a predetermined threshold (e.g., less than X % of the volume of the cartridge, where X is less than 50). In some embodiments of the present invention, the method calculates, or receives as input, the amount of building material of the type contained in the cartridge that is required to complete the build of the object, and issues an alert when the amount of building material in the cartridge is expected to be insufficient for completing the build.

From 405 (if employed) or 404 the method optionally and preferably loops back to 401 for another execution cycle. The method ends at 406.

FIG. 5 is a flowchart diagram of a method suitable for manufacturing an object according to various exemplary embodiments of the present invention. The method can be executed using system 10 or system 110.

The method begins at 500 and optionally and preferably proceeds to 501 at which computer object data in any of the aforementioned formats are received.

The method can proceed to 503 at which a layer of building material is dispensed. The building material is typically delivered from a cartridge containing the building material to a dispensing head that dispenses the layer on a receiving medium, which can be a tray of the AM system or a previously formed layer of the object. The building material can be a modeling material or a support material. Typically, the method selectively dispenses, for a particular layer, one or more regions of modeling materials and one or more regions of support material. The modeling material is preferably dispensed in a configured pattern corresponding to the shape of the object and in accordance with the computer object data.

Operation 503 is optionally and preferably preceded by 502 at which the amount of building material in the cartridge is monitored. Operation 502 can include one or more of operations 401-405 of method 400 described hereinabove. In some embodiments of the present invention operations 502 and 503 are executed simultaneously. Also contemplated, are embodiments in which 502 is initiated before 503 and continues repeatedly throughout the execution of 503 and optionally also any other operation of method 500 described below. Further contemplated, are embodiments in which 502 is executed before the dispensing 503, and embodiments in which 502 is both before and after, but not during, the dispensing 503.

The method optionally and preferably proceeds to 504 at which the dispensed building material is solidified. The type of solidification process depends on the type of dispensed materials. For example, when the building material is UV curable, the solidification comprises applying UV radiation; when the building material is curable by other radiation (e.g., infrared or visible light), the solidification comprises applying radiation at a wavelength that cures the building material.

Operations 502-504, and in some embodiments also 501, are preferably executed sequentially a plurality of times so that a plurality of layers are sequentially dispensed and solidified, while the amount of building material in the cartridge is monitored. This is illustrated in FIG. 5 as loop back arrows pointing from operation 504 to operations 501, 502 and 503. When the method loops back 503, the monitoring 502 ensures that the amount of material in the cartridge is sufficient for the sequential dispensing of the material at 503. If the method determines at 502 that the amount of material in the cartridge is insufficient, an alert is issued to allow the operator to replace the cartridge with a cartridge containing sufficient material, before moving to operation 503. When the method determines at 502 that the cartridge is empty, the execution of the other operations is ceased and an alert is issued. The layers are dispensed to form a stack of model layers made of a modeling material, and a sacrificial structure, wherein the stack of model layers and the sacrificial structure are separable from each other in a manner that maintains the shape and size of the stack of model layers without deformation.

The method ends at 505.

Figure 6A:
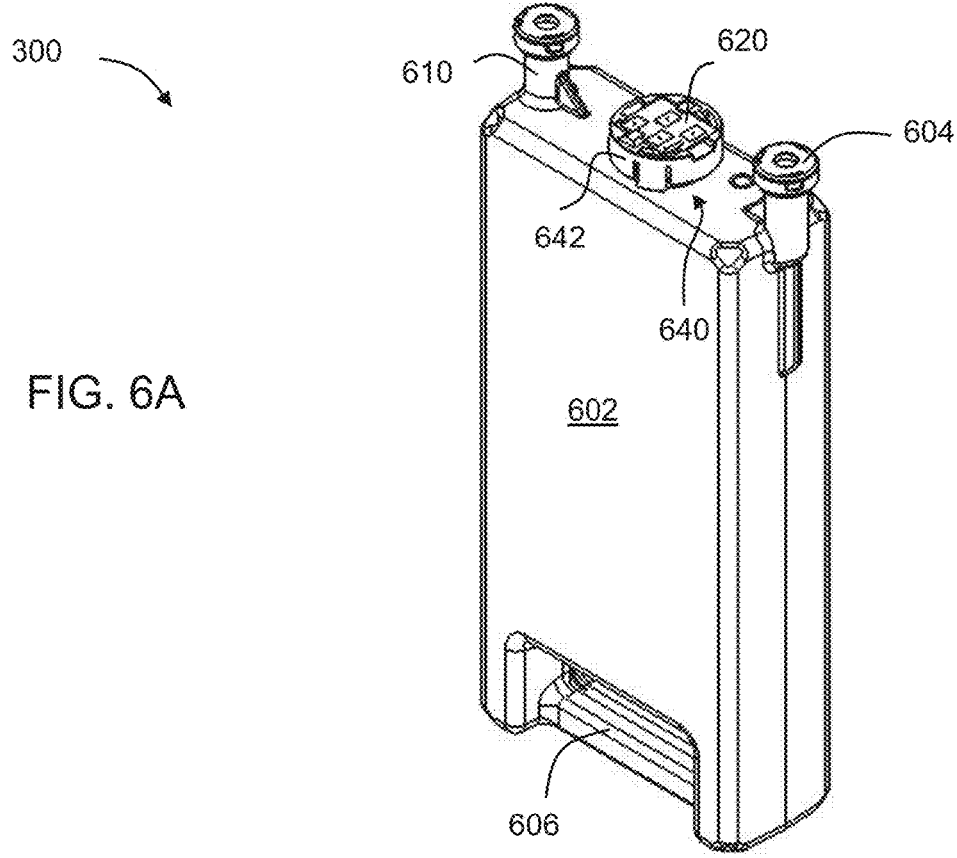
FIGS. 6A and 6B are schematic illustrations showing a perspective view (FIG. 6A) and a side view (FIG. 6B) of an exemplary cartridge, in accordance with some embodiments of the present invention.
Figure 6B:
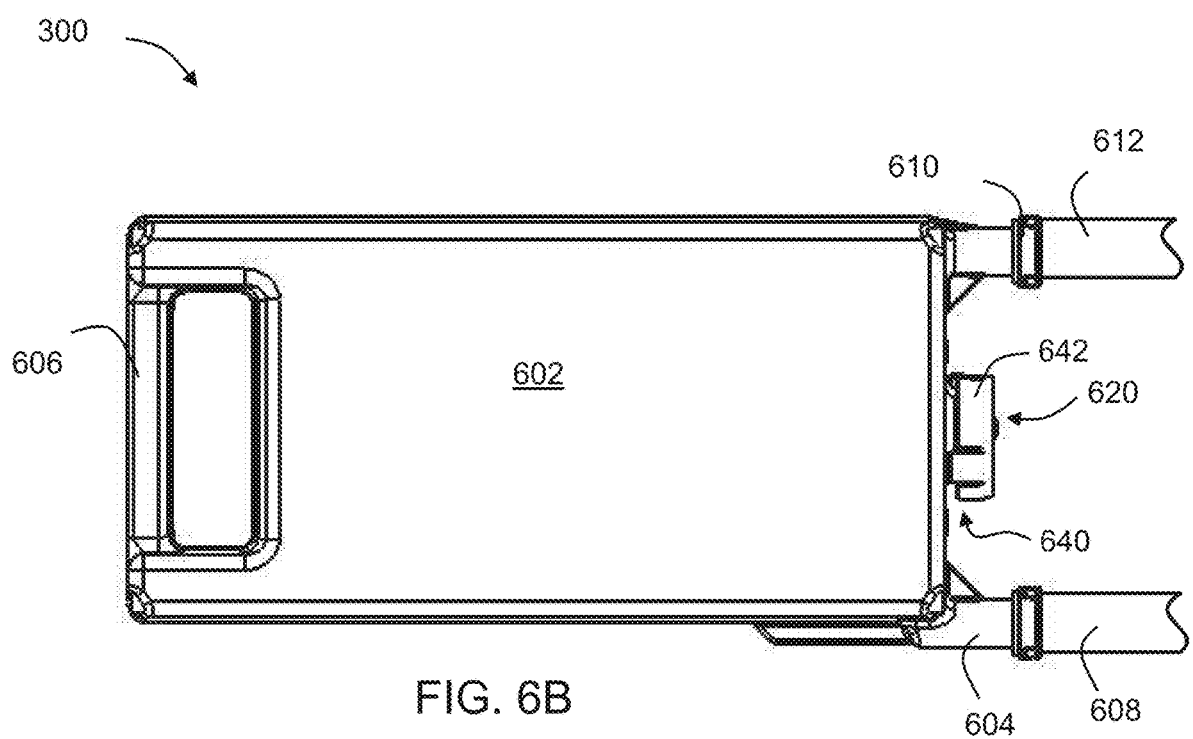

Reference is now made to FIGS. 6A and 6B which are schematic illustrations showing a perspective view (FIG. 6A) and a side view (FIG. 6B) of an exemplary cartridge 300 which can be used as one or more of the cartridges 300a, 300b, etc., of supply system 330, in accordance with some embodiments of the present invention. Cartridge 300 comprises a housing 602 for storing the building material. Housing 602 is optionally and preferably shaped to include a handle 606 in order to allow the user to easily grip cartridge 300. Housing 602 can be formed with a filling port 640 for filling the cartridge with building material. Filling port 640 is covered by a filling port cover 642. Typically, the cartridge is filled with building material through port 640 before shipment of cartridge 300, in which case filling port cover 642 is designed and constructed to prevent the end user from opening it without rupturing cover 642 or the body of cartridge 300. For example, cover 642 can be made of a disposable foil that cannot be remounted on port 640 after it has been removed.

Optionally, cartridge 300 comprises an identification tag 620. Identification tag 620 provides identification pertaining to at least one property of cartridge 300, including, without limitation, the authenticity of the cartridge, the type of building material contained in the cartridge, the amount of building material contained in the cartridge at the time of loading to the AM system, the maximal amount of building material that the cartridge can contain, etc. Identification tag 620 can be of any machine-readable type known in the art, such as, but not limited to, a barcode (e.g. a QR tag), an RFID and an RTLS. The AM system can in these embodiments comprise identification tag reader (not shown) configured for reading the data from tag 620. In some embodiments of the present invention tag 620 is mounted on or integrated with filling port cover 642, as illustrated in FIGS. 6A and 6B.

Cartridge 300 further comprises a building material outlet 604 and a vent 610. Building material outlet 604 serves for connecting cartridge 300 to a building material delivery conduit 608 which delivers the building material to the respective head of the AM system. Vent 610 serves for establishing fluid communication with the atmosphere. Alternatively, as illustrated in FIG. 6B, vent 610 can be used for establishing fluid communication with conduit 612. Conduit 612 can be connected to pump 332 or manifold 334 (not shown in FIG. 6B) in which case the amount of building material in cartridge 300, can be monitored by introducing gas into cartridge 300 via vent 610 as further detailed hereinabove.

In use, housing 602 is loaded to the AM system in an orientation in which the building material outlet 604 is at the lower part of housing 602, and the vent 610 is at the upper part of housing 602. Such orientation ensures delivery of building material through outlet 604 even when the cartridge is not full.

Outlet 604 is preferably of the quick-connection type that allows automatic sealed engagement between outlet 604 and conduit 608 upon loading of cartridge 300 to the AM system. Preferably, but not necessarily, the structure of vent 610 is similar to the structure of outlet 604, allowing automatic sealed engagement between vent 610 and conduit 612 upon loading of cartridge 300 to the AM system. These embodiments are particularly useful when it is required to monitor the amount of building material in cartridge 300 by introducing gas through vent 610, in which case conduit 612 can be already connected to pump 332 or manifold 334 upon loading of cartridge 300 to the AM system.

Figure 7A:
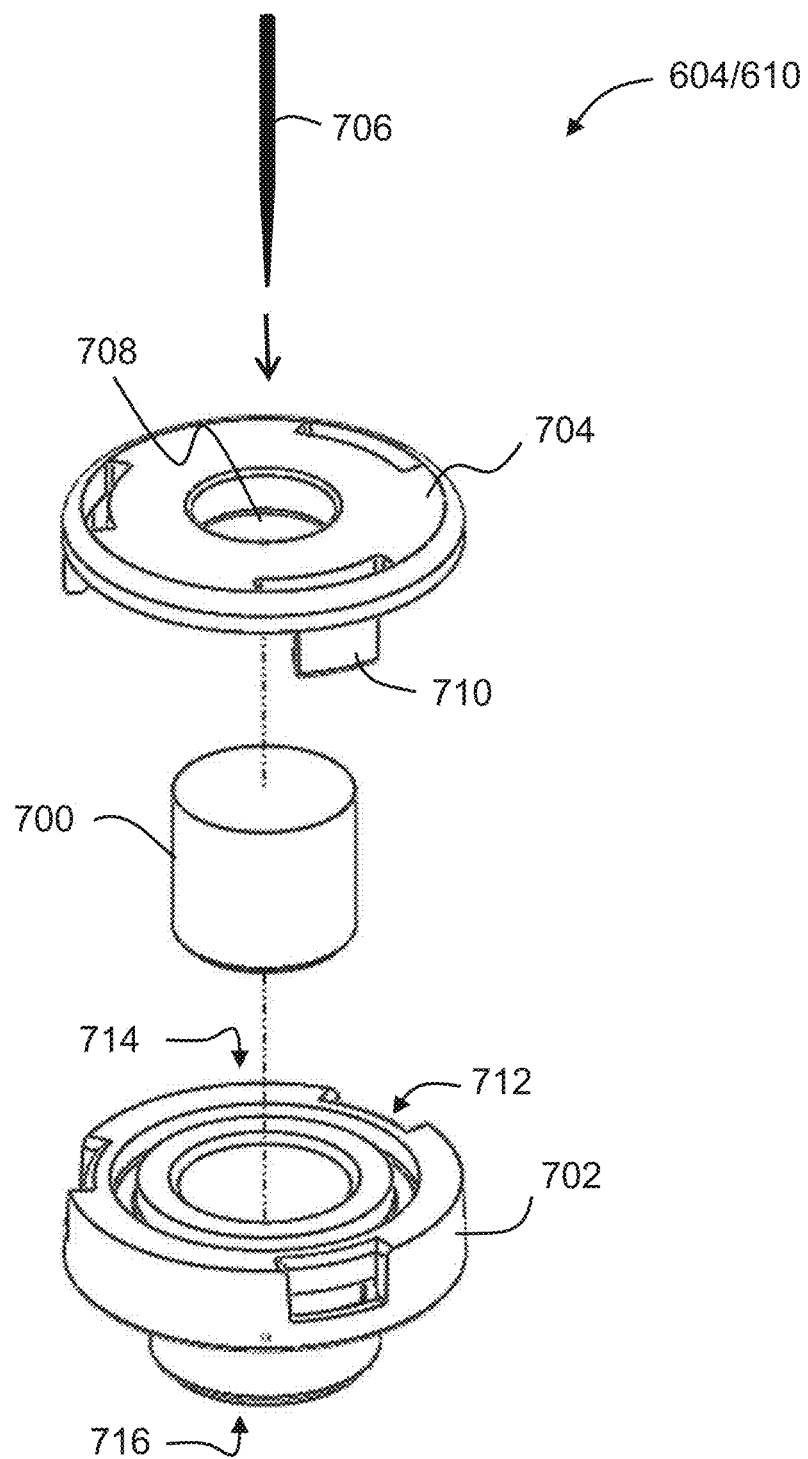
FIG. 7A is a schematic illustration showing an exploded view of a building material outlet or a vent of the exemplary cartridge shown in FIGS. 6A and 6B, according to some embodiments of the present invention.
Figure 7B:
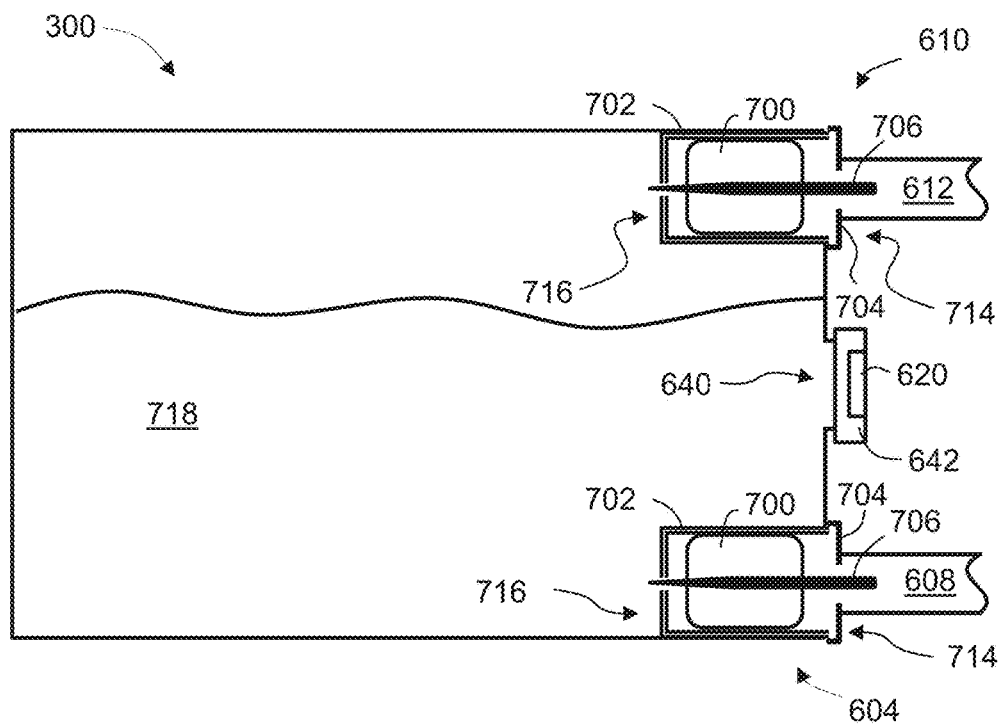
FIG. 7B is a schematic illustration showing a cross sectional view of the exemplary cartridge shown in FIGS. 6A and 6B, according to some embodiments of the present invention.

In some embodiments of the present invention the quick-connection of outlet 604 and/or vent 610 is by means of a pierceable septum. These embodiments are illustrated in FIGS. 7A and 7B which are an exploded view of building material outlet 604 or vent 610 (FIG. 7A) and a cross sectional view of cartridge 300 (FIG. 7B). While the description below is with respect to the building material outlet 604 it is to be understood that the same structure is contemplated also for vent 610.

In the embodiments illustrated in FIGS. 7A and 7B, outlet 604 comprises a pierceable septum 700 and a cup 702. Cup 702 has an open end 714 constituted to receive septum 700, and a closed end 716 opposite to the open end 714. Septum 700 can be made of any elastomeric material, including, without limitation, natural rubber, synthetic rubber, latex, silicone and the like. Outlet 604 can also comprise a cover 704 to maintain septum 700 enclosed within cup 702, as illustrated in FIG. 7B.

Cover 704 and cup 702 can be provided with snap connectors 710 and respective notches 712 for connecting cover 704 and cup 702 once septum is inserted to cup 702. Cover 704 can alternatively be provided as a metal ring pressed peripherally around cup 702. Cover 704 is typically formed with an opening 708 exposing a pierceable portion of septum 700, for allowing a needle 706 to pierce septum 700 once cartridge is loaded to the AM system. The opposite end of needle 706 is within conduit 608, so that fluid communication between the interior of cartridge 300 and conduit 608 is through needle 706.

In some embodiments of the present invention the diameter of septum 700 is slightly larger (e.g., about 1-5% larger) than the inner diameter of cup 702, such that assembling of septum 700 into cup 702 requires application of stress to septum 700. The advantage of these embodiments is that the elastomeric material of septum 700 is under stress while being enclosed in cup 702, resulting in a better sealing at the inner periphery of cup 702, and also provides septum 700 with a self-resealing property, following an extraction of needle 706.

Once cartridge 300 is loaded to the AM system, needle 706 pierces septum 700. A further motion of needle 706 through septum 702 allows needle 706 to puncture the closed end 716 of cup 702 to contact the building material 718 and to establish fluid communication between the building material 718 and conduit 608.

The advantage of enclosing septum 700 in cup 702 is that it reduces the amount of time that the building material 718 is in contact with septum 700. Since the building material is typically corrosive, chemical reactions between the building material and the polymeric material of sputum 700 may damage the polymeric material and reduce its ability to seal and be pierced and re-pierced. Cup 702 ensures that prior to the first use of cartridge 300 (e.g., when in storage or during shipment), there is no contact between the building material and the septum since the closed end 716 of cup 702 is not punctured. Only after loading the cartridge to the AM system, the cup is punctured and some building material contacts the septum. Therefore, cup 702 reduces the likelihood of such damage to occur since it reduces the interaction time between the building material and the septum.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

Examples

Reference is now made to the following examples, which together with the above descriptions illustrate some embodiments of the invention in a non-limiting fashion.

Experiments were conducted to investigate the ability of at least a few of the operations described with respect to FIG. 4 above to determine the amount of building material in a cartridge. The cartridge was of the type shown in FIGS. 6A and 6B. A pump was connected to vent 610 by conduit 612, and building material was sucked via the outlet 604 mimicking the operation of delivering building material to the dispensing head. Seven cycles were performed, where in each cycle, building material was sucked via the outlet, gas was introduced via the vent, the pressure within the cartridge was measured, and the time interval Δt from the beginning of the introduction of the gas to a time point at which the pressure reached a predetermined level of 2 cmH$_2$O was measured. In each cycle, the gas pressure within the cartridge was initially reduced to the ambient pressure (hereinafter referred to as "zero pressure"). The results are summarized in Table 1, below and shown graphically in FIG. 8.

TABLE 1

| volume of building material in the cartridge | Δt |
|---|---|
| 1000 ml | 43 s |
| 800 ml | 62 s |
| 600 ml | 66 s |
| 400 ml | 74 s |
| 200 ml | 81 s |
| 100 ml | 67 s |
| 0 ml | 85 s |

Figure 8:
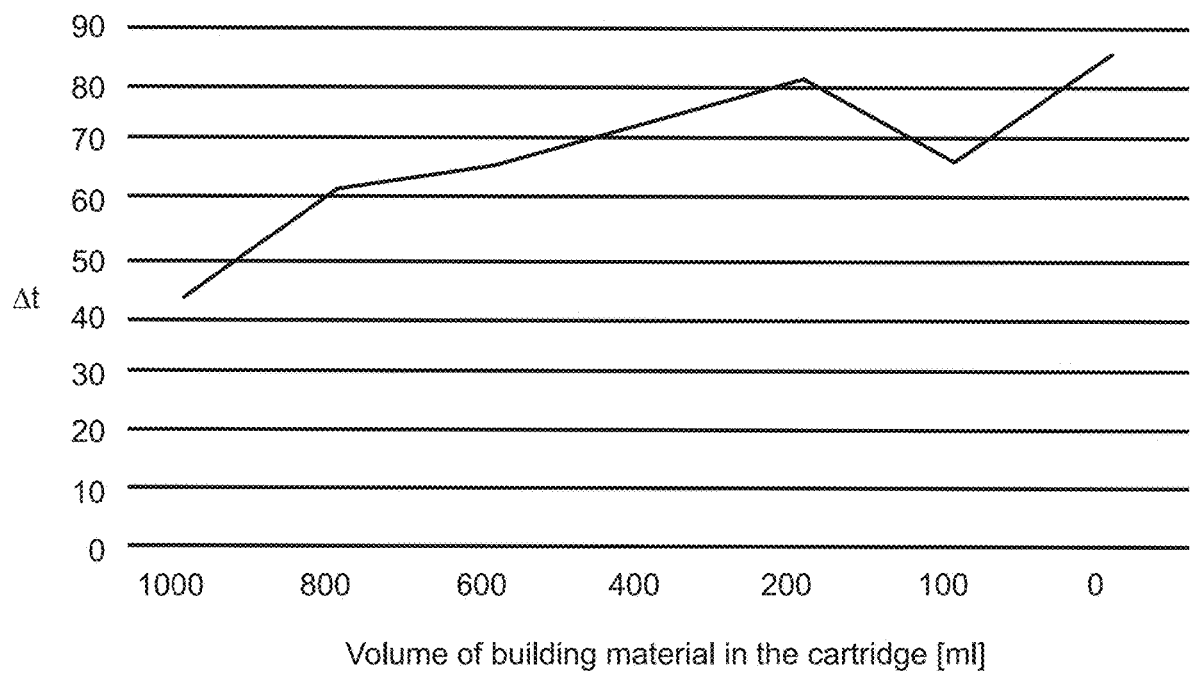
FIG. 8 is a graph showing correlation between a time-interval during which gas was introduced into a cartridge and a volume of building material in the cartridge, as obtained in experiments performed according to some embodiments of the present invention.

FIG. 8 and Table 1 demonstrate that the amount of building material in the cartridge correlates well with the time interval parameter Δt.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scoped claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of monitoring an amount of building material in a cartridge supplying the building material to a dispensing head of an additive manufacturing system via a building material delivery conduit connecting the cartridge and the dispensing head, the method comprising:
   reducing pressure in an anterior of the cartridge by a pump;
   introducing gas into a volume containing the building material in said anterior of the cartridge, following said reducing of said pressure;
   measuring pressure within the cartridge; and
   when said pressure reaches a predetermined level, determining the amount of building material in the cartridge, based on a volume of gas introduced into the cartridge or on a proxy of said volume.

2. The method of claim 1, wherein said introducing is at a predetermined volumetric flow rate, and the method comprising measuring a time interval from a beginning of said introduction of said gas to a time point at which said pressure reaches said predetermined level, and determining the amount of building material in the cartridge based on said time interval.

3. The method of claim 1, comprising measuring a mass of gas introduced into the cartridge, and determining the amount of building material in the cartridge based on said mass.

4. The method of claim 1, wherein the cartridge comprises a vent and wherein said introducing said gas is via said vent.

5. The method of claim 1, wherein said introducing said gas is via a manifold into the cartridge and into at least one additional cartridge, and wherein the method comprises measuring said pressure and determining the amount of building material also in said at least one additional cartridge.

6. The method of claim 5, wherein said measuring said pressure is at a location selected from the group consisting of: an outlet of said manifold, an inlet of the cartridges, and at an interior of the cartridges.

7. The method of claim 1, being executed while building material flows out of the cartridge to be dispensed by the additive manufacturing system.

8. The method of claim 1, being executed before or after building material flows out of the cartridge to be dispensed by the additive manufacturing system.

9. The method of claim 1, comprising issuing an alert when the amount of building material in the cartridges is less than a predetermined amount.

10. A method of manufacturing an object, the method comprising:
supplying a building material formulation from a cartridge to a dispensing head;
dispensing the building material formulation to sequentially form a plurality of layers in a configured pattern corresponding to a shape of the object; and
monitoring amount of building material in a cartridge by executing the method according to claim 1.

11. A cartridge holding a liquid material, the cartridge comprising:
a housing containing the liquid material; and
an outlet having a pierceable septum and a pierceable cup, said pierceable cup enclosing said septum in a manner that when said septum is pierced by a needle, a further motion of said needle through said septum allows said needle to pass through said cup to contact said liquid material and to establish fluid communication between the liquid material and an exterior of said cartridge;
wherein said septum is made of an elastomeric material that is reactive with the liquid material, and wherein said pierceable cup separates the liquid material from said septum prior to said passing of said needle through said pierceable cup.

12. The cartridge of claim 11, wherein the liquid is a building material for additive manufacturing.

13. The cartridge of claim 11, wherein said elastomeric material is selected from the group consisting of natural rubber, synthetic rubber, latex, and silicone.

14. The cartridge of claim 11, further comprising a vent for establishing fluid communication between an interior of the cartridge and an environment outside the cartridge, for allowing gas to enter said cartridge.

15. The cartridge of claim 14, wherein said vent comprises a pierceable septum and a pierceable cup, and is identical in structure to said outlet.

16. The cartridge of claim 14, further comprising a liquid material filling port covered by a filling port cover, wherein removal of said filling port cover causes said filling port cover to rupture.

17. The cartridge of claim 14, further comprising an identification tag providing computer-readable identification pertaining to at least one property of the cartridge.

18. The cartridge of claim 17, wherein said identification provided by said identification tag comprises at least one of: an authenticity of the cartridge, a type of liquid material contained in the cartridge, an amount of liquid material contained in the cartridge at a time at which said identification is read from said tag, and a maximal amount of liquid material that the cartridge can contain.

19. The cartridge of claim 17, wherein said identification tag is mounted on or integrated with said filling port cover.

* * * * *